United States Patent [19]

Mandet et al.

[11] Patent Number: 4,596,116
[45] Date of Patent: Jun. 24, 1986

[54] SEALING RING FOR A TURBINE ROTOR OF A TURBO MACHINE AND TURBO MACHINE INSTALLATIONS PROVIDED WITH SUCH RINGS

[75] Inventors: Gerard M. F. Mandet, Fericy; Marcel R. Soligny, Chevilly-Larue, both of France

[73] Assignee: Societe Nationale d'Etude et de Construction de Moteurs d'Aviation "S.N.E.C.M.A.", Paris, France

[21] Appl. No.: 575,988

[22] Filed: Feb. 1, 1984

[30] Foreign Application Priority Data

Feb. 10, 1983 [FR] France ................................ 83 02101

[51] Int. Cl.4 ............................................. F01D 11/08
[52] U.S. Cl. .................................. 60/39.07; 60/39.75; 415/174; 415/178; 415/214
[58] Field of Search ...................... 60/39.07, 39.75, 753, 60/39.32, 39.31, 39.83; 415/170 R, 174, 214, 178, 177, 110, 200, 196, 197, 116

[56] References Cited

U.S. PATENT DOCUMENTS

| 2,915,877 | 12/1959 | Darling ................................. 60/753 |
| 3,391,904 | 7/1968 | Albert et al. ..................... 415/116 X |
| 4,087,199 | 5/1978 | Hemsworth et al. ............ 415/197 X |
| 4,222,707 | 9/1980 | Drouet et al. ....................... 415/116 |
| 4,317,646 | 3/1982 | Steel et al. ........................ 415/178 X |
| 4,334,822 | 6/1982 | Rossmann ........................ 415/174 X |
| 4,337,016 | 6/1982 | Chaplin ............................ 415/174 X |
| 4,398,866 | 8/1983 | Hartel et al. ..................... 415/197 X |

FOREIGN PATENT DOCUMENTS

2025536 1/1980 United Kingdom ................ 415/116

*Primary Examiner*—Carlton R. Croyle
*Assistant Examiner*—Jeffrey A. Simenauer
*Attorney, Agent, or Firm*—Oblon, Fisher, Spivak, McClelland & Maier

[57] ABSTRACT

The rotor of each stage of a turbine is surrounded, with a clearance by a fixed ring, formed by a metal ring supporting internally an annular thermal screen, in the form of ceramic segments. Expansions and contractions of the metal ring under the action of air which is supplied thereto in order to control the said clearance are transformed into displacements of radial faces of the ring in contact with radial flanges rigid with the turbine casing and seals serve to ensure fluidtightness of the ring.

24 Claims, 14 Drawing Figures

SEALING RING FOR A TURBINE ROTOR OF A TURBO MACHINE AND TURBO MACHINE INSTALLATIONS PROVIDED WITH SUCH RINGS

BACKGROUND OF THE INVENTION

Field of the Invention

The present invention relates to a turbine rotor assembly incorporating a ring surrounding the rotor blades and to installations including such a rotor assembly or such rotor assemblies.

Discussion of the Background

It is known that changes in the rating of turbo machines, which are relatively frequent when they are incorporated as engines mounted in aircraft, will give rise to substantial variations in the clearance between the rotor blade tips of each stage of the turbine and the ring, generally of metal, which surrounds it. If special arrangements were not made to maintain this clearance between predetermined limits, and especially to avoid its elimination or even becoming negative, damage to the blades of the rotor is liable to occur. It is known to control the clearance between the blades of the rotor of each stage of a turbine and the metal ring which surrounds it, by means of selective ventilation of the turbine casing, of the blades and of the disk of the rotor, as well as the ring of each stage. The ventilation air used for this purpose is generally bled from the compressor associated with the turbine, of which a non-negligible percentage of power output is thus used to provide this control of the clearance.

U.S. Pat. No. 4,087,199 (Hemsworth) describes an annular structure of a gas turbine, comprising an annular thermal screen formed substantially by segments of ceramic material, of which the upstream and downstream edges have grooves, and a metal ring of hollow section, mounted within the casing of the turbine, and carrying radial support members, adapted to engage in the grooves of the ceramic segments. As indicated in column 5 of this prior specification, the hollow interior of the metal ring can be used as a balancing chamber, from which extend a series of holes allowing a flow of air behind the ceramic segments, to cavities formed respectively adjacent to their upstream and downstream edges, the said balancing chamber being in communication with a cooling fluid, such as air bled from the compressor; another hole enables the cooling air supplied from the balancing chamber to scavenge and to cool down the rear face of the ceramic segments.

In this prior proposal, the ceramic segments thus form an annular thermal screen, interposed between the enclosure swept by the blades of the turbine where the very hot gases flow, on the one hand, and, on the other hand, the metal ring which supports said segments of ceramic. This thermal screen of ceramic material offers various advantages: its high resistance to elevated temperatures enables especially, if not to completely avoid all cooling of the outer face of the thermal screen, at the very least to provide for it only a very small flow of cooling air, bled from the compressor. In contrast, the respective coefficients of thermal expansion of the ceramic material constituting the thermal screen and of the metal constituting the hollow section ring are so different that special arrangements must be made in order to avoid the differences in thermal expansion becoming transformed into the generation in the ceramic material segments of substantial stresses, possibly capable of reducing the useful life or even causing fracture. Moreover, the ceramic segments must be connected internally to the metal ring so as to ensure fluidtightness of the composite ring thus formed, and also to avoid said metal ring not being swept over all its surfaces by very hot gases which traverse the turbine enclosure. According to U.S. Pat. No. 4,087,199 hereinbefore referred to, this sealing problem is resolved by conferring a second function, of fluidtightness, to the support members of the ceramic segments; as, however, these support members, likewise metallic, are in thermal direct contact with the metal ring, of which they form moreover an integral part, there is provided, according to this prior proposal, a castellated form for the surfaces of the said support members, which are in direct contact with certain parts of the ceramic segments, this arrangement being intended to reduce the contact surfaces, and as a result the transmission of heat to the metal ring. As a result, however, risks arise not only of damaging the teeth thus provided in the support members, but also of disintegration of the ceramic material with which they are in very local contact, and a substantial reduction in the fluidtightness of the surfaces in contact. On the other hand, the substantial difference between the respective coefficients of expansion of the metal ring and of the ceramic segments can give rise to relative movements of these different parts, which are liable to modify the contact conditions between their corresponding surfaces, and as a result the fluidtightness provided in the region of these contact surfaces.

SUMMARY OF THE INVENTION

According to the present invention there is provided in a turbine rotor assembly of a turbo-machine, a rotor carrying rotor blades, a casing surrounding the rotor, means defining an annular thermal screen surrounding the rotor blade tips, said screen including ceramic segments, each segment having in its upstream and downstream faces a part-annular groove, a metal ring of hollow section carrying radially-extending support members engaging the grooves of the segments, and means for delivering air into the interior of the metal ring, means mounting the metal ring within the casing which permit free expansion of the metal ring in at least one of the radial, the longitudinal and the peripheral directions, and sealing means effective between the metal ring and the casing so as to ensure fluidtightness irrespective of thermal expansions and contractions.

The ring for a turbine rotor of a turbo machine according to the present invention is distinguished thus essentially from the ring hereinbefore proposed in that it comprises fluidtight seals which are independent of the radial support members of the ceramic segments, which give rise to various advantages. The fluidtight seals can ensure their proper function whatever the relative possible movements, of low amplitude, of the various elements of the ring, due in particular to the difference between their respective coefficients of expansion. The seals can be replaced by new seals so as to restore fluidtightness of the ring without it being necessary to change others, more important and more costly elements of the said ring, as is the case with the prior embodiment, where wear of the contact elements of the metal ring, of the support members and of the ceramic segments cannot be compensated, when they disturb the overall fluidtightness of the ring, while exchanging the corresponding elements which have been most worn. In particular, the contact surfaces between the ceramic segments and the metal parts of the ring can be relatively large, and do not include any zone, in particular any projection which is so narrow that its contact with the ceramic material may give rise to a rapid wear of the said metal part and/or a disintegration of the corresponding part of the ceramic segment. This arrangement thus avoids possible radial shifting between adjacent ceramic segments, which are liable to disturb the satisfactory operation of the corresponding stage of the gas turbine.

An abradable material may be carried by the internal face of the ceramic segments, which enables advantageously to provide a second function of the thermal screen formed by these segments.

In a first preferred embodiment in accordance with the invention, the two substantially plane radial faces of the metal ring cooperate, with the interposition of the seals, with radial flanges, likewise plane, which are secured internally to the casing. This arrangement is particularly advantageous, insofar as the relative movements, of small amplitude, of the metal ring and of the ceramic segments, which are a result, as already been mentioned several times, of the important difference between the coefficients of expansion of the corresponding materials, can take place without each seal ceasing being locked between the corresponding part of the metal ring and the corresponding plane surface of one of the two radial flanges.

In a first modification of this embodiment, the seals are located in annular grooves of the radial faces of the metal ring. In a second modification, the seals are located in grooves formed on the outer faces of the radial support members and also engage in grooves of the ceramic segments.

According to another characteristic of this first embodiment of the invention, the ceramic segments have their longitudinal adjacent edges assembled by a mortise and tenon joint with a clearance permitting displacement of the said segments due to their expansion and to that of the metal ring in the peripheral direction, this mode of assembly of the various ceramic segments which constitute the thermal screen, being particularly advantageous since it renders the respective expansions of the metal ring and of the ring formed by ceramic segments, independent of one another.

According to another advantageous characteristic of this first embodiment of the invention, at least one resilient deformable member can be interposed between each ceramic segment and the corresponding part of the metal ring, for example in the form of at least one leaf spring, which extends longitudinally of the rotor, and of which an intermediate part is attached to the internal wall of the metal ring, while its ends cooperate respectively with the upstream and downstream parts of the ceramic segment, which can be provided for this purpose with longitudinal grooves in order to locate the said ends of the leaf spring. This resilient mounting of the various segments constituting the thermal screen with respect to the metal ring is particularly advantageous since, in the case of elimination of the clearance between the blades of the rotor and the internal faces of the ceramic segments, the latter can be eliminated in the centrifugal direction owing to the deformation of the resiliently deformable corresponding members, in particular of the corresponding leaf springs, which reduces considerably the risks of damage or of fracture of the ceramic segments.

In a second preferred embodiment of the invention, the metal ring is rigid with two radial flanges, which are internally secured to the casing, and of which the internal edges form radial support members, which are engaged in grooves of the ceramic segments, and are adapted to retain the fluidtight seals, preferably in the form of hollow toruses.

According to another characteristic of this embodiment, which is particularly simple, of the invention, the two radial flanges have, on their respective faces directed towards one another two series of tongues, preferably resilient, which interdigitate and are so disposed as to exert, on the external face of each ceramic segment, a thrust, which applies it preferably resiliently, on the radial support members. This resilient mounting, which is particularly simple, of the ceramic rings on the metal ring offer numerous advantages which have already been indicated hereinbefore in relation to the first embodiment of the invention.

According to another advantageous characteristic of this second embodiment, the longitudinal adjacent edges of the ceramic segments are shaped, in the region of the internal faces of the said segments, so that their longitudinal edges overlap in the manner of roof tiles. With this arrangement also, the respective thermal expansions of the metal ring on the one hand, and the ring formed by the ceramic segments, on the other hand, are practically independent of one another.

The present invention also relates to an installation of a turbo machine, of which the rotors of a high pressure turbine thereof are each surrounded by a fixed ring having one at least of the characteristics hereinbefore referred to. The turbo machine installation according to the present invention includes at least a first duct which supplies, into the internal space of the metal ring associated with each high pressure stage of the turbine, ventilation air, bled, at a first predetermined pressure, from the enclosure surrounding the or each flame tube of the combustion chamber of the turbo machine and/or from a suitably selected stage of the or one of the compressors. This arrangement is particularly advantageous since it enables the internal cooling of the metal ring while using a current of air at a predetermined temperature, this cooling air having been bled either at a single point of the installation, or at two distinct points of the latter, the two air flows bled having been mixed in a variable proportion before being directed into the or each of the said ducts.

According to another advantageous characteristic of one installation according to the present invention, second ducts, traversing radially the metal rings associated with the different stages of the high pressure turbine, direct pressure air at a second predetermined pressure, higher than that existing in the corresponding stage of the turbine, to the outer faces of the various ceramic segments, and in the direction of the cavities formed in the respective external faces and to the contact surfaces of each segment with the adjacent segments and with the upstream and downstream radial support members. This arrangement is particularly advantageous since it enables the avoidance of a proportion of the very hot gases, flowing in the corresponding high pressure stage of the turbine, not coming into direct contact with the parts of the ceramic segments and of the metallic ring which are adjacent to one another, in spite of the presence of the fluidtight seals. In case of local wear of the fluidtight seals this arrangement will give rise to a leakage of pressure air, in the opposite sense, that it to say from the cavities formed optionally between the external faces of the ceramic segments to the turbine enclosure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a fragmentary view, in section on an axial plane, of one stage of a turbine, constructed according to a first modification of a first embodiment of the invention, this Figure also showing, in part, the inlet guide blade array of this stage and that of the following stage;

FIG. 2 is a fragmentary view in section along the line II—II of FIG. 1;

FIGS. 4 and 5 are fragmentary views in section respectively along the lines IV—IV of FIG. 6 and V—V of FIG. 3;

FIG. 6 is a view in section along the line VI—VI of FIG. 4;

FIGS. 8 and 9 are fragmentary views, in axial section, similar to FIG. 3, illustrating respectively two different embodiments for the circulation of pressure air to the rings of two stages of the high pressure turbine of the installation of the first embodiment of the present invention;

FIG. 10 is a fragmentary view, in axial section, similar to FIG. 1, showing a ring of a turbine rotor, constructed according to the second embodiment of the invention;

FIGS. 11 and 12 are views in section on the lines XI—XI and XII—XII of FIG. 10;

FIG. 13 is a perspective view of one of the ceramic segments of the ring partially illustrated in FIG. 10; and FIG. 14 illustrates a modification of the second embodiment illustrated in FIG. 10.

DESCRIPTION OF THE PREFERRED EMBODIMENTS

In the axial sectional view of FIG. 1, 1A designates the rotor of one stage of the turbine of a turbo machine, and 2A the inlet guide blade or nozzle array which precedes it. The rotor 1A is surrounded, with a predetermined clearance e, by a ring, which is secured to the casing 3 of the turbine, and which is built up according to the present invention, in the following manner: the ring is mounted between two annular surfaces, which are substantially plane, of two radial flanges, particularly an upstream flange 4m which is rigid with the internal face of the casing 3, a downstream flange 4v which, in the embodiment illustrated has, externally of the casing 3, an extension of a cross-section in T shape, 4v1, which is secured, for example, by bolts not shown, between a radial outer flange 3v, rigid with an element of the casing 3 associated with the rotor 1A of the turbine and its inlet guide nozzle array 2A, and, on the other hand, an outer radial flange, 3a, rigid with an element of the casing 3 associated with the inlet guide nozzle array 2B of the intermediate stage following the turbine, (which has not been illustrated completely).

A metal ring 5A of hollow internal section, is formed essentially by an annular internal wall 5i, rigid with an upstream radial wall 5m, both being supported by a longitudinally-extending annular flange 5b, engaged in a first annular, longitudinal, groove, of a connecting part 6, of which an annular radial groove 6A is itself engaged on an outer annular radial flange 2b of the inlet guide nozzle array 2A. The downstream radial wall 5v of the metal ring 5A is formed by a radial flange of a ring of transverse L section, of which the longitudinal flange is secured to an annular edge portion of the internal wall 5i of the ring 5A, by a row of bolts such as 7. The assembly is so disposed that the radial faces of the metal ring 5A, that is the faces of its radial walls 5v and 5m which are directed towards the plane faces of the flanges 4v and 4m, are also plane and in sliding contact with the latter. Two annular seals, for example of graphitized asbestos 9v and 9m are disposed in annular grooves of the lateral walls 5v and 5m, of the ring 5A, so as to provide fluidtightness in the sliding contact surfaces zone, in spite of small relative displacements due particularly to thermal expansions.

The radial walls 5v and 5m, of the metal ring 5A extend towards the base by radial members which, in the example illustrated in FIG. 1, comprise two internal radial collars 5v1 and 5m1, themselves extended, in the direction of the axis of the turbine, by elements having a transverse section in the form of a segment of a ring 5v2 and 5m2, of which the convex shape is directed towards the radial median plane of the ring, disposed symmetrically the one with respect to the other at a plane perpendicular to the axis of the turbine, these elements 5m2 and 5v2 forming support members. Sectors of the ring 8, of appropriate ceramic material, are assembled as illustrated in FIG. 2 in order to form an annular thermal screen between the metal ring 5A and the rotor 1A.

The upstream and downstream edges of each of the ceramic segments 8 are provided respectively with concave grooves 8m and 8v having a transverse section in the form of an arc of a circle, for engaging them into the parts 5m2 and 5v2 forming annular collars, respectively, with upstream and downstream support members. As apparent in FIG. 2, one of the longitudinal edges of each segment 8 forms a quasi-tenon 8a which is engaged with an appropriate clearance in a quasi-mortise 8b, provided in the longitudinal corresponding edge of the adjacent segment 8. The outer face of each ceramic segment has, at its centre, a longitudinal groove 8c, in which is engaged, substantially without clearance in the peripheral sense, a peg or other elongate member 8d, of which the two ends are engaged, by any appropriate means, respectively in the parts 5v1 and 5m1 of the radial suport members. In the example illustrated, the two end portions of each peg 8d have a reduced section, which is engaged, respectively upstream and downstream, in a corresponding hole of the part 5m1 and 5y1, the engagement being effected before the bolting of the ring 5v on the internal wall 5a. It will be understood that each ceramic segment is retained in the ring 5A by the pin 8d independently of thermal expansions, which are possibly different, of the components 5A and 8; as the expansions or the contractions of thermal origin of the ring 5A, and as a result also the intervals between the metal pegs 8d, with which they are rigid, are generally greater than the expansions or the corresponding contractions of the various ceramic segments, these expansion differences can be compensated by modifications of the peripheral clearance of the tenon 8a of each segment 8 in the mortise 8b of the adjacent segment.

The parts 5v2 and 5m2 of the radial support members of the segments 8, which are either in the form of annular collars, or in the form of tongues separated one from the other, can be made sufficiently thin in order to provide a sufficient elasticity to compensate for the differences in the radial expansions of the metal members and of the ceramic rings.

One at least of the radial faces of the metal ring 5A, particularly the face of the radial wall 5v directed downstream, as well as the corresponding surface of the radial flange 4v is provided with means to secure the metal ring 5A with respect to the radial flanges 4v and 4m in the peripheral direction. In the embodiment illustrated in FIG. 1, notches 10v are used, which are provided respectively on the aforementioned cooperating faces, so as to interdigitate preferably with clearance enabling the free expansion of the metallic ring 5A in one at least of the peripheral and radial directions; the hereinbefore mentioned notches can be replaced by projections and/or recesses, having the same function.

It will be apparent from the preceding description that the outer face of the metal ring 5A, of hollow section, is open opposite to a row of orifices 11, provided in the corresponding member of the casing 3 of the turbine so as to discharge into an annular collector 12, itself provided on the outer face of the said element of the casing 3. In this annular collector 12 at least one duct 13 discharges, which supplies to the said collector 12, ventilation air under an appropriate pressure, of which the origin will be disclosed hereinafter. A flexible duct 14, which, in the example illustrated, is formed by a bellows, connects each opening 11 with the interior of an air distributor 15, in the form of a ring of hollow section. In the example illustrated, this distributor 15 comprises a perforate sheet metal member of transverse U section, of which a part 15a extends parallel and at a small distance from the inner wall 5i of the metal ring 5A, whilst the parts 15b and 15c are substantially parallel to the inner faces of the radial walls 5m and 5v of the ring 5A. It will be understood that the air drawn under pressure into the annular collector 12 flows as indicated by the arrows, and passes through openings 11 and flexible ducts 14, into the distributor 15, from which the air under pressure inpacts on the internal faces of the walls 5i, 5m and 5v of the metal ring 5A, so as to temperature condition them, that is to say to cool them or heat them up according to the temperature of the ventilation air supplied to the duct 13. This air escapes downstream, through holes in the wall 4v, into an annular enclosure, from which it departs through a duct not shown, for example to the jet pipe of the turbo machine. There will be described hereinafter a control system for the distribution of this ventilation air, appropriate to regulate the clearance e between the rotor 1A and the corresponding ring of the turbine.

The internal face of each ceramic segment 8 advantageously carries a layer 16 of an abradable material of known type, which can be deposited with a plasma flame gun, with a spatula, or even by brazing.

Figure 3:
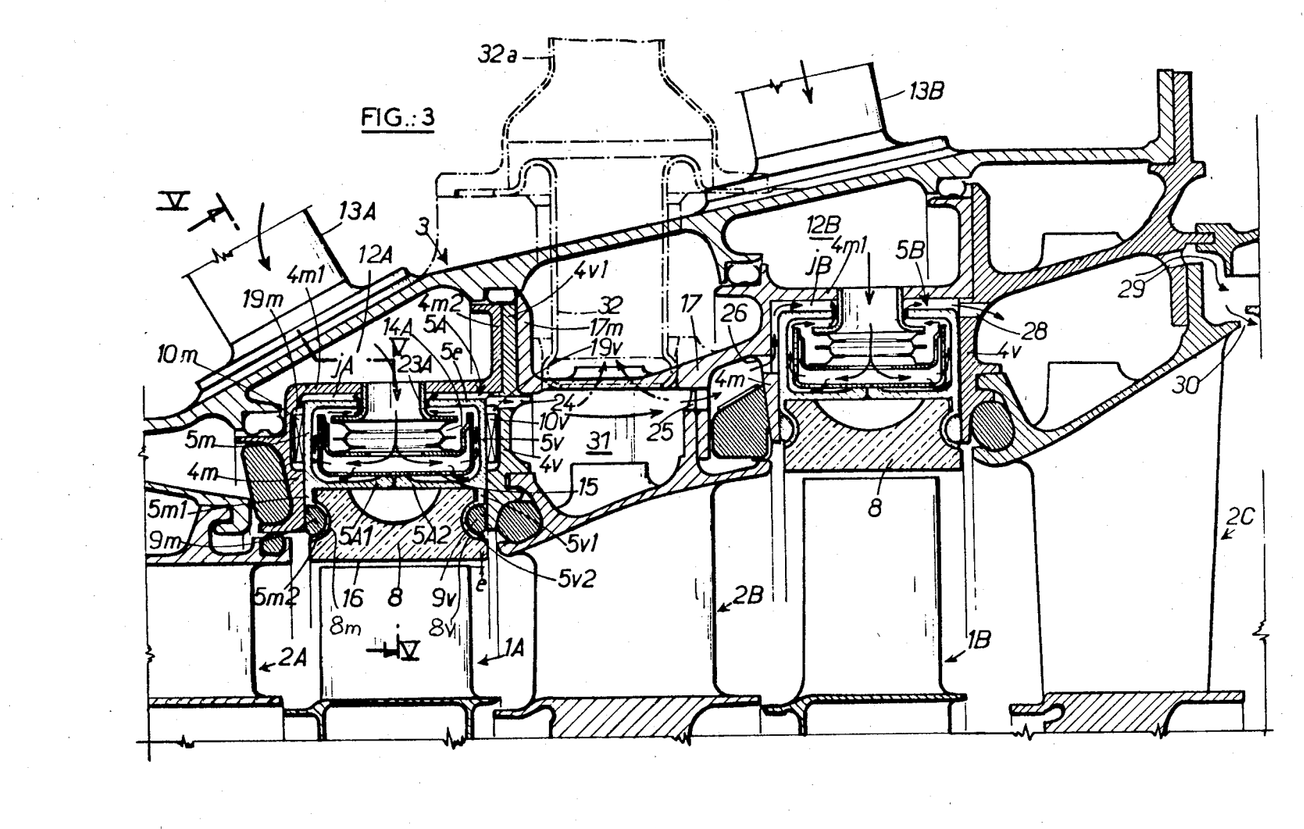
FIG. 3 is a fragmentary view, in axial section, similar to FIG. 1 of two successive stages, formed in accordance with a second modification of the first embodiment of the invention, of the high pressure turbine of a turbe machine installation.

The modification illustrated in FIGS. 3-6, in which there have been designated by the same references corresponding parts to those of the first embodiment illustrated in FIGS. 1 and 2, does not differ from the latter except as now to be described. FIG. 3 represents only, in part, two stages of the high pressure turbine of a turbo machine installation according to the present invention. The rotors of these two stages, 1A and 1B have respective inlet nozzle guide blade arrays 2A and 2B and the fixed rings 5A and 5B are each equivalent to the ring 5A of FIGS. 1 and 2 and surround respectively the rotors 1A and 1B. The two annular flanges 4v and 4m, which cooperate with the radial faces of each metal ring, for example 5A, are interconnected by a cylindrical ring 4m1 which coaxially surrounds, with a predetermined radial clearance jA, the outer wall 5e of the corresponding metal ring 5A. The metal ring 4m1 is connected by its upstream edge, with the radial flange 4m, and, by its downstream edge, with another radial flange, 4m2, which a row of bolts (not shown in FIG. 3) connects to an outer extension 4v1, of the radial flange 4v. Furthermore, for the first stage, that is to say the metal ring 5A, the same row of bolts serves to secure the assembly of the two flanges, that is the radial flange 4m and its radial extension 4v1, to a radial flange, 17m, of a cylindrical annular member 17, which supports the inlet guide nozzle blade array 2B of the second stage.

Numerous annular seals, which it is not necessary to describe in detail, provide for fluidtightness of the radial flanges 4m and 4v with respect to the adjacent elements of the arrays 2A and 2B respectively. The two radial flanges 4m and 4v interconnected by the cylindrical ring 4m1, thus form a kind of channel, which is open radially outwardly of the corresponding stage of the turbine, and in which the composite ring, formed by the metallic ring 5A and by the ceramic segments 8, is mounted in the manner hereinbefore described, but with differences substantially as follows. The metal ring 5A is itself formed by two annular semi-shells, of U section, 5A1 and 5A2, which are assembled in the median radial plane of the ring 5A, by longitudinally-extending tubes 18 as shown in FIG. 6. The ends of the tubes 18, of which the width corresponds substantially to the transverse dimension of the hollow interior of the ring 5A, are internally screw-threaded, in order to enable screw-threaded members 18m and 18v to be screwed in, the locking of which ensures securing of the two semi-shells 5A1 and 5A2. The tubular members 18 are preferably regularly distributed around each metal ring such as 5A.

The various ceramic segments 8, of which the upstream and downstream edges are shaped as has been hereinbefore described with reference to FIG. 1, are supported respectively by engagement in corresponding grooves of their upstream and downstream edges, of radial support members 5m1-5m2 and 5v1-5v2 respectively, which extend inwardly of the turbine the radial walls of the semi-shells 5A1 and 5A2. Moreover, as illustrated in FIG. 5, the radial support members form two annular collars, of which each has radial slots f (broken lines), avoiding the generation of substantial stresses in the corresponding collar, for example 5m2, which will be due, in the absence of these radial slots f, to the difference between the respective temperatures of the internal and external boundaries of the collar. Seals 9m and 9v are located in external grooves provided in the external faces of the radial support members, that is to say in the concavities of the collars 5m2 and 5v2, which engage, in the manner of resilient grippers, in the corresponding grooves of the upstream and downstream edges of the various ceramic segments. The seals 9m and 9v also cooperate with parts which are further inmost of the radial faces, directed the one towards the other, of the two radial flanges 4m and 4v, so as to provide fluidtightness of the composite ring, whilst at the same time facilitating relative displacements of small amplitude between the composite ring and the radial flanges, in at least one of the radial and peripheral directions. As in the embodiment illustrated in FIGS. 1 and 2, these displacements are limited, here by teeth with parallel flanks 10m and 10v (see also FIG. 5), of which each is engaged within a recess 19m or 19v, provided in the corresponding face of the radial seal 9m or 4v. FIG. 5 clearly shows that in this embodiment, the cooperation of the teeth 10m, with the corresponding recess 19m permits limited radial displacements of the composite ring 5A-8 with respect to the radial flange 4m and it is the same for the teeth 10v and with the recess 19v.

In this embodiment two resilient deformable members, particularly two leaf springs 20a and 20b (FIG. 4), are interposed between each ceramic segment 8 and the corresponding part of the metal ring. The two leaf springs 20a and 20b extend longitudinally, as shown in FIG. 6. Each has its intermediate part attached to the internal wall 5i of the metal ring, particularly at pins 21a and 21b, each of which is embedded in a hole formed in adjacent edges of lower elements of the two annular semi shells 5A1 and 5A2. Furthermore, the ends of each of the leaf springs 20a and 20b cooperate respectively with upstream and downstream parts of the corresponding ceramic segment 8. This cooperation is effected by engagement of the corresponding end portions of the leaf spring, for example 20a (FIG. 6), in longitudinal grooves, which are provided in the external face of the ceramic segment 8, and which have been designated by 22 in FIG. 6. It will be understood that, if for any reason whatsoever, the clearance e, between the layer 16 of abradable material, deposited on the internal face of each of the segments 8, on the one hand, and the tips of the blades of the corresponding rotor, on the other hand, becomes zero, the radial components of the impulses which the said blades apply to the ring formed by the segments 8, cause the leaf springs such as 20a and 20b to deflect.

As apparent in FIG. 3, the assembly 4m-4m1-4m2 associated with the metal ring, for example 5A, of each stage of the high pressure turbine, define, with the corresponding part of the casing of the turbine, an annular collector 12A or 12B, which is supplied with ventilation air through at least one substantially radial duct 13A or 13B. In the interior of each metal ring of hollow section, for example 5A an annular distributor 15 is provided, which is constituted essentially by a perforate sheet metal member of U cross section, to which is secured, outwardly, a nonperforate sheet of metal, with a flexible duct, particularly a metal bellows such as 14A, connected to a rigid duct 23A. The cylindrical part, which is further outermost, of the rigid duct 23A traverses the upper wall 5e of the metal ring 5A at an opening of diameter slightly in excess of the external diameter of the rigid duct 23A, and the latter discharges into the annular collector 12A through the wall 4m1 in which the duct is encased in a fluidtight manner by means known in themselves. The ventilation air is thus directed into the distributor 15 and flows as indicated by arrows, whilst passing through various rigid ducts such as 23A and the bellows duct 14A to which they are connected, and it is then projected through the perforate sheet of the distributor 15 against the internal faces of the lateral walls and of the lower (as shown) wall of the metal ring 5A. The ventilation air, having thus accomplished its function of thermal conditioning of the walls of the metal ring 5A, escapes from it through the clearance, as indicated hereinbefore, existing between the internal walls of the various rigid ducts such as 23A and the corresponding holes of the upper wall 5e of the metal ring 5A. The air thus flows into the annular narrow chamber jA, from whence it exhausts to the second stage of the turbine, whilst passing through orifices 24, 25 and 26, the first being provided in the external extension 4v1 of the radial flange 4v, and the two others, in parts of the support of the nozzle guide blade array 2B, of the second stage of the turbine.

The ventilation air thus derived from the first stage flows into the annular narrow chamber jB, of the second stage, where it mixes with the ventilation air exhausting from the corresponding metal ring 5B. This mixture of ventilation air exhausts from the annular chamber jB through an orifice 28, it then traverses an orifice 29 provided in the nozzle guide blade array 2C, of the first stage of the low pressure turbine (not shown in detail), and finally it is exhausted into the enclosure of the chamber of the said first stage of the low pressure turbine through an orifice 30.

In a modification, illustrated in broken lines in FIG. 3, the orifices 28, 29 and 30 are omitted, and the ventilation air leaving the metal ring 5B of the second high pressure stage of the turbine flows into the annular chamber jB in the upstream direction, that is to say in the sense contrary to the flow direction hereinbefore described for the ring of the turbine of the second stage 1B. The ventilation air supplying the ring 5B then flows through the orifice 25 into a sealed chamber 31, which is provided in the support of the nozzle guide blade array 2B, and into which the ventilation air drawn from the metallic ring 5A likewise flows through the orifice 24, as hereinbefore described. These two ventilation air currents then enter a radial duct 32 (chain lines), which extends to the outside of the casing 3, where it connects with another radial duct 32a (chain lines), of which the other end (not shown) terminates within the exhaust casing (jet pipe) of the turbo machine (likewise not shown).

Figure 7:
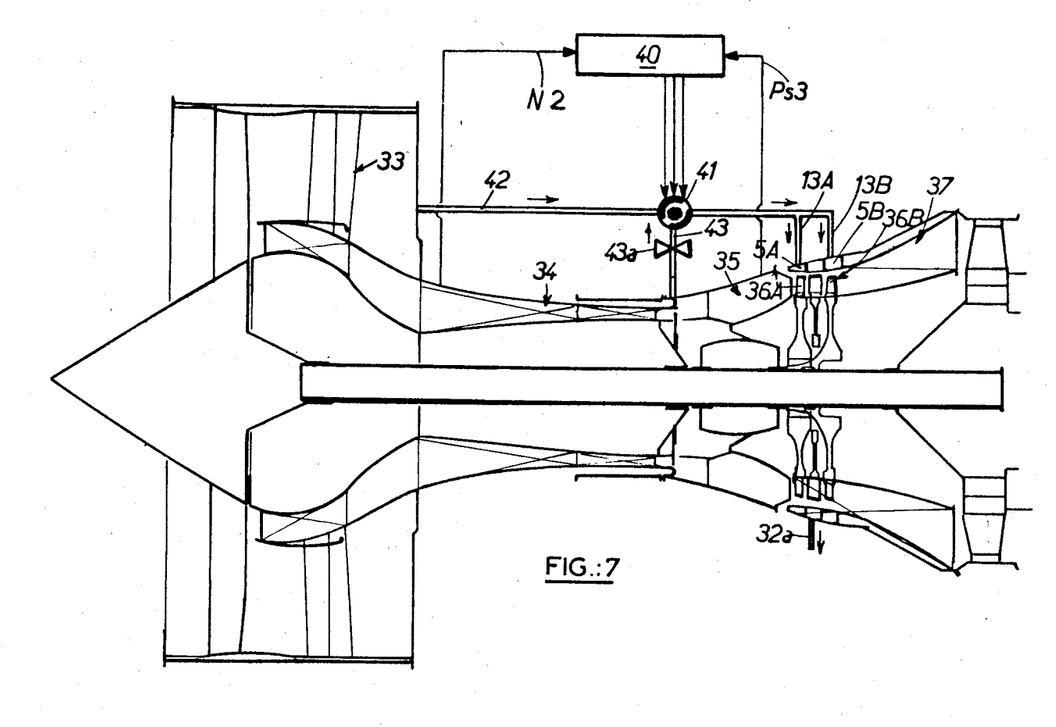
FIG. 7 is a diagram illustrating a turbo machine installation according to the present invention and its system for ventilating air distribution to rings of the two stages of the high pressure turbine.

FIG. 7 is a diagram of a turbo machine installation in accordance with the invention. This installation comprises a fan 33, a compressor 34, comprising N stages, a combustion chamber 35, a high pressure turbine comprising two stages 36A and 36B, each of which comprises a composite ring according to the present invention, as hereinbefore described, and a low pressure turbine 37. In the embodiment diagrammatically illustrated in FIG. 7, it has been assumed that the turbo machine comprises, in order to provide for its control, a computer of the type capable of overall control, indicated by the block diagram 40.

This computer, on the basis of signals emitted by various sensors already present in the turbo machine, processes the relevant information for example relating to rating of the turbine, for example N2 (rotational speed of the high pressure turbine) or relative to pressures, for example Ps3 (the pressure existing in the combustion chamber 35) and calculates a signal, which is delivered to a throttle chamber 41, which, as a function of the signal received, places the radial ducts 13A and 13B which supply the hollow metallic rings 5A and 5B with ventilation air (associated with the two stages of the turbine HP) in communication with one or other of the ducts for bleeding ventilation air 42 and 43 or both simultaneously.

While the duct 42 bleeds air from the fan 33, at a moderate temperature $T_1$, the duct 43 in which is inserted a diaphram 43A, bleeds ventilation air at a stage adjacent to the outlet of the high pressure compressor 34, that is to say at a temperature which is relatively high, $T_2$.

The computer 40 is capable of imposing on the throttle chamber 41 any intermediate position enabling variation in the proportion of air flows respectively at the temperature $T_1$ and the temperature $T_2$ in order that the mixture supplying the rings 5A–5B takes up an intermediate temperature between $T_1$ and $T_2$ appropriate to optimize the clearance at the tips of the blades according to the operational conditions.

The ventilation air which has served for the thermal conditioning of the two rings 5A and 5B, is then evacuated through one of two circuits which have been hereinbefore described with reference to FIG. 3, for example, according to the modification indicated in broken lines in this Figure, to the exhaust casing (jet pipe) of the turbine, through the intermediary of the radial duct 32a. The clearance (e in FIG. 3) between the blades of the rotor of each stage of the high pressure turbine and the fixed ring which surrounds it may thus be automatically regulated by the computer calculator 40 which, by the control of the throttle chamber 41, is capable of sending into the rings the referred to cold ventilation air, drawn from the duct 42, or hot, drawn from the duct 43.

In a modification, the cold ventilation air is bled from a zone downstream of the third stage of the straightener or discharge stator blades of the high pressure compressor 34 (FIG. 7), and the hot ventilation air is bled from a stage of this high pressure compressor, adjacent to its outlet, for example at its last stage. After having served its function, the ventilation air is then exhausted to the low pressure turbine 37, while traversing with the air the circuit which has been hereinbefore described of FIG. 3, and which passes, in particular through the orifices 28, 29 and 30.

FIG. 8 is a fragmentary view of a modification of two stages of the high pressure turbine of a turbo machine installation in accordance with the present invention. Once again parts similar to those of the first embodiment described with reference to FIGS. 1 and 2 have been given the same reference numerals. In the region of the first stage, the casing wall 3 of the turbine comprises a boss 44a, in which is mounted a radial duct 44, supplied with pressure air, bled from one stage of the high pressure compressor, adjacent to its outlet. This stage is so selected that the pressure of the pressure air is in excess of that existing in the corresponding stage of the turbine. For example, if the pressure existing in the turbine enclosure is 7.1 bars at the inlet of the first stage and 4.3 bars at its outlet, it is possible to bleed the pressure air in one of the last stages of the high pressure compressor, for example the thirteenth, under a pressure approximately of 12.5 bars. The radial duct 44 is extended inwardly of the turbine by a duct 45, which radially traverses the cylindrical ring 4m1, interconnecting the two radial flanges 4m and 4v, as well as tne external wall 5e of the metal ring 5A. The further inmost end of the duct 45 is lightly frictionally engaged in a rigid duct 46, which is integral with the cylindrical ring 4m1, so that the two ducts 45 and 46 will be capable of relative movement, of limited amplitude, in the radial direction, without ceasing to be in fluidtight contact, thus taking into account the expansions, possibly different, of the various components described.

The duct 46, which is rigid with the ring 4m1, is connected by a flexible duct, in the form of a bellows, 14A, to a second rigid duct 48, which is rigid with the metal ring 5A at its lower wall 5i and which traverses the annular distributor 15, mounted in the interior space of the metal ring 5A, as has been hereinbefore described, with reference to FIG. 3. The duct 48 discharges onto the outer face of one of the ceramic segments 8, particularly into a recess 8e provided on this external face. In the embodiment considered, the recesses 8e of the ceramic segments 8 are in the form of troughs with a section in the form of a circular segment, and, extend between two peripheral edges of the element 8, so that the recesses 8e of the various segments 8 inter-communicate to form an annular channel, which is supplied with pressure air by a radial duct assembly 44–45–46–14A–48, hereinbefore described or, preferably, by several similar radial ducts, preferably regularly distributed around the periphery of the metal ring 5A. It is appropriate, in this respect, to emphasize that the axial planes of FIGS. 3 and 8 are different, the radial ducts 13A and 44 being however adjacent to a common plane perpendicular to the axis of the turbine, but situated in different axial planes. Longitudinal grooves 49 are formed in the outer face of each ceramic segment 8 in order to enable tne pressure air to reach the upstream and downstream edges of the corresponding segment 8. As a result, the outer sides of the seals 9m and 9v are subjected to the pressure of the pressure air, of for example 12.5 bars, which is in excess of the pressure, of about 7.1 or 4.3 bars, existing at the same region in the turbine enclosure, which avoids very hot air circulating in the enclosure containing the turbine blades so as not twist or warp the seals 9m and 9vd and does not thus take part in contacting the metal ring 5A, on which the very hot gases would have a thermal action opposed to that of the ventilation air, which has been hereinbefore described.

The various segments 8, supported by the metal ring 5B of the second stage of the high pressure turbine also have, on their external face, recesses 8e, forming a continuous annular channel, as well as, at least on the side of the first stage, longitudinal grooves 49 for the passage of pressure air. The pressures existing in the turbine enclosure respectively at the inlet and at the outlet of the second stage being only 2.7 and 1.6 bars, it is possible to use, as the pressure air, a proportion of the ventilation air of the first stage, which, as has already been described with the reference to FIG. 3, flows in the annular collector 12A through the radial duct 13A (FIG. 3), under a pressure for example of 3.7 bars. For the latter, it is sufficient to provide a longitudinal duct 50, which connects the annular collector 12A to the tongue and groove joint provided in the annular flange 4m of the second stage, a supplementary passage 51 being provided in the corresponding radial wall of the metal ring 5B in order to provide communication between the tongue and groove joint 19m and the groove 49.

Figure 9:
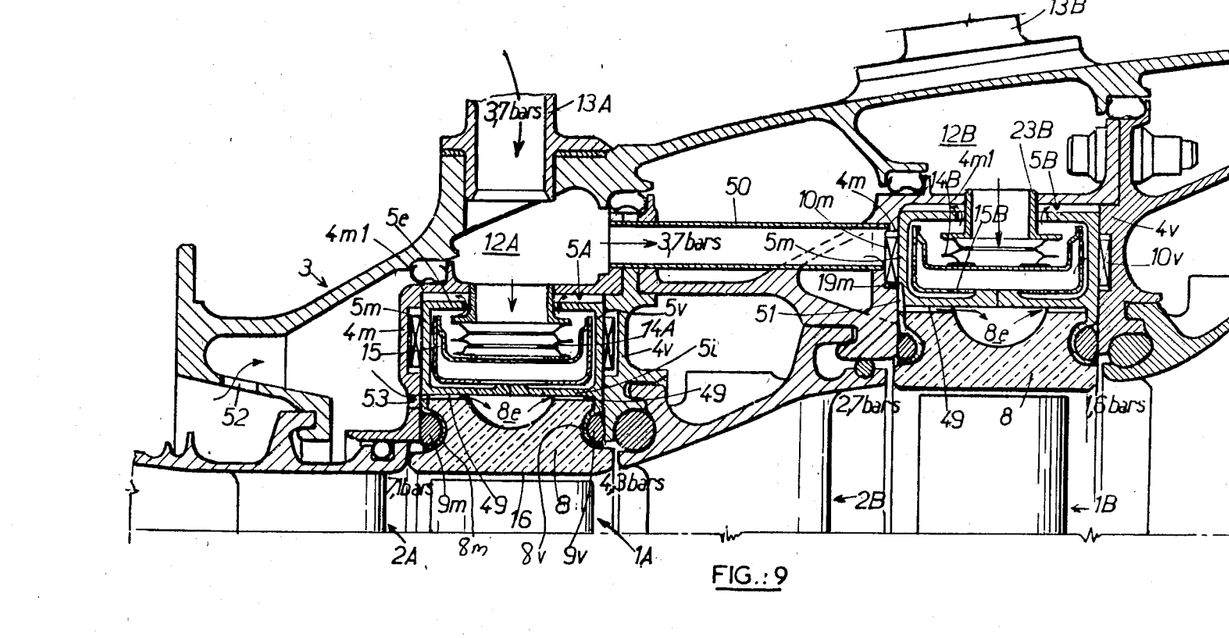

In the modification illustrated in FIG. 9, the pressure air intended for the segments 8 of the first stage of the high pressure turbine is bled directly from the enclosure surrounding the or each flame tube of the combustion chamber of the turbo machine, upstream of the said first stage, through an orifice 52, and it passes, through orifices 53 provided in the radial upstream flange 4m of the first stage into longitudinal slots, 49, provided in the external face of the ceramic segments 8. With regard to the pressure air of the second stage of the high pressure turbine, it is constituted by a proportion of the ventilation air, bled from the annular collector 12A of the first stage, as in the case illustrated in FIG. 8.

The embodiments of the invention, which have been hereinbefore described with reference to FIGS. 1 to 9, are capable of numerous modifications, of which several have already been indicated hereinbefore, and which all fall within the scope of the invention. The use of a proportion of the ventilation air for pressurisation of the ring of the second stage of the high pressure turbine (FIGS. 8 and 9), is optional. The recesses 8e provided in the external faces of the ceramic segments are also optional. The pressurisation of these recesses, or, in their absence of the external faces of the ceramic segments 8 is likewise optional. In the case of turbo machine installation which does not incorporate a computer 40 with overall control (FIG. 7), it is possible to provide a known control circuit for the clearance e (FIGS. 1 and 3) by using as input information rotational speed N2 and pressure Ps3, or equivalent information. In all cases, the flow of ventilation air in the first ducts such as 13A and 13B can be controlled by a throttle chamber subject to an operational parameter, suitably selected, of the turbo machine. The leaf springs 20a and 20b (FIGS. 4 and 6), which are associated with each ceramic segment 8, can be provided in any desired number whatsoever; their shape, their manner of securing to the metal ring and to the corresponding ceramic segments are likewise optional matters. The leaf springs may be replaced by other resilient members, such as helical springs, plugs of resilient material resistant to elevated temperatures and so on. The layer of abradable material 16, deposited on the internal face of each of the ceramic segments 8, is also a matter of option. The ceramic segments may be of two different kinds; one kind comprises tenons at each end, the other mortises. Similarly, the convexity of the support members and the concavity of the ceramic segments may clearly be interchanged.

In the view in axial section of FIG. 10, 1A designates the rotor of one stage of the turbine of a turbo machine, which is surrounded, with a predetermined clearance e by a ring, which is secured to the casing 3 of the turbine, and is constructed according to a second embodiment of the present invention, in the following manner. It comprises essentially a metal ring 5A, of which the upstream and downstream walls 5m and 5v, are formed by two radial flanges, which are secured internally to the casing by two longitudinal flanges, 5s1 and 5s2 respectively. Securing is effected by two rows of rivets 54, or equivalent bolts. The radial flange 5m is extended, in the upstream direction, by a longitudinal flange 5b, which can serve to connect the metal ring 5A to the inlet nozzle guide array (not shown), of the stage of the turbine under consideration, as this has been shown and described hereinbefore with reference to FIG. 1. The two radial flanges 5m and 5v are extended downwardly (as shown) by radial support members 5m1 and 5v1, which themselves carry, on their faces directed towards one another, substantially longitudinally-extending flanges 5m2 and 5v2. These longitudinal flanges 5m2 and 5v2, are respectively engaged in grooves 8m and 8v, respectively provided in the upstream and downstream edges of one ceramic segment 8, which is shown in perspective in FIG. 13. Seals, 9m and 9v, in the form of a split toroidal members, are interposed between the parts 5m2 and 5v2 of the support members and internal surfaces of grooves 8m and 8v of the various ceramic segments 8, so that these seals will be locked by the parts mentioned of the support members, and will prevent the very hot gases passing from the enclosure swept by the blades of the turbine to the outer faces of the ceramic segments 8, while passing around the flanges 5m2 and 5v2.

Furthermore, the upstream radial flange, 5m is extended downstream, to a predetermined radial spacing from the ceramic segments 8, by a longitudinal flange 5j, which constitutes the internal wall of the metal ring 5A, and of which the end is connected in a fluidtight manner to the corresponding part of the downstream radial flange 5v, for example by a row of bolts, not shown.

At a predetermined distance, d, beneath the longitudinal flange 5j, the two radial flanges, 5m and 5v, have, substantially in the region of their connections with support members 5m1 and 5v1, on their respective faces directed towards one another, two series of tongues 5l1 and 5l2, which are preferably sufficiently thin to be resilient, and which interdigitate, as shown in the developed view in section of FIG. 11. These metallic, resilient, tongues 5l1 and 5l2, are so disposed as to exert on the outer face of each ceramic segment 8 a thrust which applies it resiliently against the support members 5m2 and 5v2.

In a preferred embodiment, which has been illustrated in FIG. 14, each of the tongues 5l1 and 5l2 is applied by its rounded end only on the external face of the corresponding ceramic segment 8. On the other hand, the tongues of one at least of the two series, for example the tongues 5l1, each carry an intermediate projection 55 (see also FIG. 12), which is engaged in a groove 8r, of the outer face of the corresponding segment 8, so as to secure against in rotation in one sense at least the ring formed by the segments. As the rotor of the turbo machine turns always in the same sense, the tangential component of the impulse which it can communicate to certain at least of the segments 8 in the case of elimination of the clearance e (FIG. 10) is always in the same sense, however, as apparent in FIGS. 12 and 13, the groove 8r provided on the outer face of each of the segments 8 can be open at one end and closed at its opposite end. As apparent in FIG. 12, the longitudinal adjacent edges of the ceramic segments are shaped, in the vicinity of their inner faces, which can carry a coating 16 of an abradable material, so that their longitudinal edges overlap in the manner of roof tiles. This arrangement can be provided by forming externally of each ceramic segment a projecting edge 8t in one of the peripheral edges of each segment 8, and a projection 8s on its other peripheral edge, this projection 8s being adapted to engage with the projecting edge 8t of the adjacent segment 8, with a predetermined clearance in the peripheral direction, in order to compensate for the differences in expansion between the ceramic segments 8, on the one hand, and the radial metal support member assembly 5m1–5m2, 5v1–5v2, on the other hand.

A radial duct 13A, traversing the casing 3 of the turbine in the region of the ring 5A, by means of an appropriate nozzle, may lead to the interior of the metal ring 5A, through its outer open face, ventilation air, which has been bled for example from one stage of the compressor of the turbo machine, which has been suitably selected from the point of view of the pressure and the temperature of the air flowing in this stage of the compressor. The ventilation air supplied through the radial duct 13A impacts directly on the flange 5j of the metal ring 5A, and likewise sweeps over the radial walls, 5m and 5v. Apertures 56m and 56v traversing the radial flanges in the region of their parts 5m1 and 5v1 respectively, provide communication between the enclosure in which the blades of the turbine rotate with the parts of each ceramic segment 8, on which are provided the two series of tongues 5/1 and 5/2. Furthermore, the wall 5m has adjacent its longitudinal extension 5b, holes 57 providing communication between the external enclosure to the tongues 5/1, 5/2 and an enclosure under pressure, for example the external enclosure of the or each flame tube of the combustion chamber of the turbo machine. Because of this the air which passes through the holes 57 then through continuity passages between the tongues 5/1 and 5/2 then through holes 56m and 56v serves as obstruction air in order to prevent the return of very hot gases from the enclosure swept by the blades of the turbine to the metallic parts supporting the ring of ceramic segments.

The embodiment which has just been described with the aid of FIGS. 10 to 14, has especially the advantage that in the case of elimination of the clearance e (FIG. 10) the various ceramic segments 8 can withdraw in the centrifugal direction by resilient deformation of the tongues 5/1 and 5/2, which avoids any damage or any fracture of the ceramic segments.

The ventilation air supplied through the radial duct 13A to the interior of the metal ring 5A can exhaust subsequently therefrom through a longitudinal duct 50, traversing the radial flange 5v, in the direction of the inlet nozzle guide blade array (not shown) of the following stage of the turbine.

The embodiment of FIGS. 10 to 14 is also capable of numerous modifications, all falling within the scope of the invention. The ventilation apertures 56m and 56v are optional. The means for holding the ring formed by the segments 8 of ceramic are optional matters; they may differ from those hereinbefore described, constituted in particular by the intermediate projections 55 of the tongues 5/1 and by the peripheral grooves, 8r, of the segments 8.

Finally, it will be readily apparent that one does not depart from the scope of the present invention by employing for the interface between the adjacent segments of the embodiment described with reference to FIGS. 10 to 14, the systems of tenons and mortises described in the first embodiment of the invention (FIGS. 1 to 9) or, conversely, by employing, for the first embodiment of the invention overlapping segments in the manner of roof tiles, such as have been described for the second embodiment of the invention.

We claim:

1. A turbine rotor assembly of a turbo-machine, comprising:
    a rotor (1A) for carrying rotor blades;
    a casing (3) surrounding the rotor;
    first and second plane radial flanges (4m, 4v) internally fixed to the casing (3);
    means defining an annular thermal screen surrounding tip portions of said rotor blades, wherein said screeen further comprises a plurality of ceramic segments (8), each of said segments (8) having in upstream and downstream faces thereof a part-annular groove (8m, 8v) and carrying a coating (16) of an abradable material on an internal face thereof;
    a metal ring (5A, 5B) of hollow section with first and second plane radial walls (5m, 5v) which cooperate respectively with said plane radial flanges (4m, 4v) and further carrying radially-extending support members (5m2, 5v2) rigid with said radial walls (5m, 5v) wherein said support members extend radially inwardly of said ring (5A, 5B) in the form of first and second annular collars (5m2, 5v2) engaging said grooves (8m, 8v) of said segments and further having grooves formed on external lateral faces thereof;
    sealing means positioned between said grooves of said support members (5m2, 5v2) and said plain radial flanges (4m, 4v) wherein said sealing means further comprises a plurality of toroidal seals; and
    means for delivering air into an interior portion of said metal ring (5A, 5B).

2. An assembly according to claim 1, wherein the two radial flanges (5m, 5v) have, on their respective faces directed towards one another, a first and second series of resilient tongues (5/1, 5/2) which interdigitate and exert on the radially outer face of each segment (8) of ceramic a thrust, and which resiliently applies the thrust on to the radial support members (5m2, 5v2).

3. An assembly according to claim 2 wherein each tongue (5/1, 5/2) further comprises a rounded end by which the thrust is applied to the outer face of the corresponding ceramic segment (8).

4. An assembly according to claim 2 wherein the tongues (5/1) of at least one of the first and second series each carry an intermediate projection (55), the outer face of the corresponding segment (8) has a central groove (82), so engaged by the intermediate projection (55) as to prevent motion of the ring formed by the segments (8), in rotation in at least one sense.

5. An assembly according to claim 1 wherein adjacent edges of the ceramic segments (8) are shaped, in the region of the internal faces of the said segments (8), so that their longitudinal edge portions (8t, 8s) overlap one another.

6. An assembly according to claim 1 wherein the radial flanges (5m1, 5v1) are traversed by ventilation apertures (56m, 56v) which provide communication between the enclosure of the turbine rotor with those parts of each ceramic segment (8) against which the two series of tongues (5/1, 5/2) are applied.

7. A turbine rotor assembly for a turbo-machine, comprising:
    a rotor (1A) for carrying rotor blades;
    a casing (3) surrounding the rotor;
    first and second plane radial flanges (4m, 4v) internally fixed to the casing (3);
    means defining an annular thermal screen surrounding tips of the rotor blades, said screen including ceramic segments (8), each segment (8) having in upstream and downstream faces thereof a part-annular groove (8m, 8v) and carrying a coating (16) of an abradable material on its internal face;
    a metal ring (5A, 5B) of hollow section with first and second plane radial walls (5m, 5v) which cooperate respectively with said plane radial flanges (4m, 4v) and further carrying radially-extending support members (5m2, 5v2) rigid with said radial walls (5m, 5v) wherein said support members extend radially inwardly of said ring (5A, 5B) in the form of first and second annular collars (5m2, 5v2) engaging said grooves (8m, 8v) of said segments and further having grooves formed on external lateral faces thereof;

means for delivering air into the interior of said metal ring (5A, 5B);

means mounting the metal ring (5A, 5B) within the casing (3) which permit free expansion of the metal ring (5A, 5B) in at least one of radial, longitudinal and peripheral directions; and sealing means (9m, 9v) positioned between the metal ring (5A, 5B) and the casing (3) so as to ensure fluidtightness irrespective of thermal expansions and contractions, wherein said sealing means further comprises fluidtight seals (9m, 9v) accommodated in said grooves of said support members (5m2, 5v2); and means for preventing movement of at least one of said radial walls (5m, 5v) of said metal ring (5A, 5B) with respect to said radial flanges (4m, 4v) with which such cooperates wherein said means for preventing movement further comprises a plurality of projections (10m, 10v) and a plurality of recesses (19m, 19v) provided, respectively, in said radial walls (5m, 5v) of said rings (5A, 5B) and on the corresponding radial flanges (4m, 4v) so as to cooperate with one another, with a predetermined clearance in one of said peripheral and radial directions.

8. An assembly according to claim 7, wherein each of said segments has a groove (8c) formed therein and further comprising a plurality of elongated members (8d) wherein an intermediate part of each segment (8) is secured with respect to the corresponding part of the metal ring (5A, 5B) by at least one of said elongated members (8d), which traverses said groove (8c) of the said segment (8) and wherein ends of each elongated members (8d) are applied against radial faces (5m1, 5v1) of the metal ring (5A, 5B).

9. An assembly according to claim 7 further comprising a cylindrical ring (4m1) interconnecting the two annular flanges (4m, 4v), and an outer wall (5e) of the metal ring (5A, 5B), the cylindrical ring (4m1) coaxially surrounding with a predetermined radial clearance said outer wall (5e) of said metal ring (5A, 5B) wherein said cylindrical ring (4m1) is rigid with at least one of the first and second radial flanges, with which such forms a channel open radially outwardly.

10. An assembly according to claim 7 further comprising a plurality of elongated members distributed around said metal rings wherein the metal rings (5A, 5B) further comprises first and second annular semi-shells (5A1, 5A2) of U section, which are assembled, in a radial plane, by said elongate members (18).

11. An assembly according to claim 7, further comprising at least one resilient, deformable, member (20a, 20b) interposed between each ceramic segment (8) and a corresponding part of the metal ring (5A, 5B).

12. An assembly according to claim 11, wherein the resilient, deformable member (20a, 20b) further comprises a leaf spring which is longitudinally disposed, the metal ring (5A, 5B) has a radially internal wall (5i), each ceramic segment (8) has longitudinal grooves (22) in upstream and downstream parts thereof, an intermediate part of the leaf spring (20a, 20b) is applied against the internal wall (5i) of the metal ring (5A, 5B), and wherein the ends of the leaf spring (20a, 20b) cooperate respectively with the longitudinal grooves (22) in the upstream and downstream parts of the corresponding ceramic segment (8) in order to locate said ends of the leaf spring (20a, 20b).

13. A turbo-machine installation, further comprising at least two turbine rotor assemblies according to claim 7 and further comprising at least one first duct (13A, 13B) supplying to the interior hollow of the metal ring (5A, 5B) associated with each stage of the turbine, ventilation air at a first predetermined pressure, and means for bleeding the ventilation air from a zone surrounding combustion chamber means of the installation and selectively from a stage of the compressor means of the installation.

14. An installation according to claim 13, further comprising an annular perforate distributor (15) which is disposed in the internal hollow of the metal ring (5A, 5B) and is supplied with ventilation air from said first duct (13A, 13B), the ventilation air impacting the internal surface of the metal ring (5A, 5B).

15. An installation according to claim 13, further comprising an annular collector (15), and a flexible duct (14A, 14B) connecting the outlet of said first duct to the collector.

16. An installation according to claim 13, further comprising a throttle chamber (41) controlling the air flow into the first duct (13A, 13B), the chamber (41) being itself controlled by an operational parameter of the turbine.

17. An installation according to claim 16, further comprising a computer (40) and a plurality of sensors mounted within the turbo machine and supplying signals relating to the rating (N2) of the turbine and the pressure (Ps3) existing in the combustion chamber (35) to the computer (40), the computer (40) acting to generate a signal based on said information which is sent to the throttle chamber (41), which as a function of this signal enables communication of the first ducts (13A, 13B) selectively with various stages of the high pressure turbine of the installation, and various stages of the installation, whereby air can be bled and supplied to said first ducts (13A, 13B).

18. An installation according to claim 17, further comprising a fan (33)

means for bleeding cold air from the outlet of the fan (33), and ducting for collecting the air leaving the internal spaces of the various rings (5A, 5B) of the high pressure turbine and for guiding the air to a single radial duct (32a) terminating at the exhaust casing of the turbine, hot air being additionally bled from the outlet of the high pressure compressor (34).

19. An installation according to claim 13 wherein the compressor means includes a high pressure compressor having more than three stages, cold air being bled downstream of the straightener stator blades of the high pressure compressor and hot air being bled from a stage of the compressor adjacent to its outlet, and the air exhausting from the internal spaces of the ring of the high pressure turbine being exhausted to a zone upstream of the low pressure turbine.

20. An installation according to claim 13, further comprising second ducts (44, 50) traversing the said metal rings (5A, 5B) which serve to direct the pressure air, at a second predetermined pressure, to the outer faces of the various ceramic segments (8) and surfaces of each segment (8) cooperating with the adjacent segments and with said support members.

21. An installation according to claim 20, further comprising a high pressure turbine with two stages, the second ducts (44) being associated with the first stage of the high pressure turbine and being supplied with air bled from one high pressure stage of the compressor (34) adjacent to its outlet.

22. An installation according to claim 21, further comprising a space (8e) lying between a said ring (5A) of the first stage of the turbine and the segments (8) of the ceramic ring, circuit means (52, 53, 49) extending from a region external to the combustion chamber to said space, the space being supplied by a bleed from outside of the combustion chamber.

23. An installation according to claim 22 wherein the second ducts (50) associated with the second stage of the high pressure turbine are supplied with a proportion of the ventilation air intended for the first stage of said high pressure turbine.

24. An assembly according to claim 7, wherein said first and second annular collars (5m2, 5v2) include a plurality of radial slots (f) regularly distributed thereon.

* * * * *